United States Patent
Liao et al.

(10) Patent No.: US 12,548,109 B2
(45) Date of Patent: Feb. 10, 2026

(54) PRESERVING TUMOR VOLUMES FOR UNSUPERVISED MEDICAL IMAGE REGISTRATION

(71) Applicant: City University of Hong Kong, Hong Kong (CN)

(72) Inventors: Jing Liao, Hong Kong (CN); Yan Xu, Hong Kong (CN); Qihua Dong, Hong Kong (CN); Hao Du, Hong Kong (CN); Xin Wang, Beijing (CN); Ying Song, Beijing (CN)

(73) Assignee: City University of Hong Kong, Hong Kong (CN)

( * ) Notice: Subject to any disclaimer, the term of this patent is extended or adjusted under 35 U.S.C. 154(b) by 265 days.

(21) Appl. No.: 18/366,735

(22) Filed: Aug. 8, 2023

(65) Prior Publication Data

US 2025/0054098 A1 Feb. 13, 2025

(51) Int. Cl.

| | |
|---|---|
| *G06T 3/18* | (2024.01) |
| *G06T 7/00* | (2017.01) |
| *G06T 7/30* | (2017.01) |
| *G06T 7/62* | (2017.01) |

(52) U.S. Cl.
CPC .............. *G06T 3/18* (2024.01); *G06T 7/0012* (2013.01); *G06T 7/30* (2017.01); *G06T 7/62* (2017.01); *G06T 2207/10016* (2013.01); *G06T 2207/20081* (2013.01); *G06T 2207/30096* (2013.01)

(58) Field of Classification Search
CPC .... G06T 3/18; G06T 7/62; G06T 7/30; G06T 7/0012; G06T 2207/10016; G06T 2207/20081; G06T 2207/30096
See application file for complete search history.

(56) References Cited

U.S. PATENT DOCUMENTS

| | | | | |
|---|---|---|---|---|
| 9,218,643 | B2 * | 12/2015 | Siewerdsen | ............... G06T 7/35 |
| 11,538,176 | B2 * | 12/2022 | Kabus | ....................... G06T 7/30 |
| 11,989,851 | B2 * | 5/2024 | Willcut | ..................... G06T 3/14 |

OTHER PUBLICATIONS

Mingyuan Meng et. al., Brain tumor sequence registration with non-iterative coarse-to-fine networks and dual deep supervision.
(Continued)

*Primary Examiner* — Xiao M Wu
*Assistant Examiner* — Ryan Allen Barham
(74) *Attorney, Agent, or Firm* — S&F/WEHRW

(57) ABSTRACT

Similarity-based deformable registration of medical images that contain tumor regions often undesirably leads to disproportionate volume changes to tumor regions. An image-registration framework for preserving tumor volumes while promoting similarity in non-tumor part is provided. The framework involves a two-stage process. In the first stage, similarity-based registration is used to identify potential tumor regions by their volume change, generating a soft tumor mask accordingly. In the second stage, a volume-preserving registration network is used. The network uses a novel adaptive volume-preserving loss that penalizes the change in size adaptively based on the masks calculated from the previous stage. The framework balances image similarity and volume preservation in different regions, i.e. non-tumor and tumor regions, by using soft tumor masks to adjust the imposition of volume-preserving loss on each one.

13 Claims, 10 Drawing Sheets

(56) References Cited

OTHER PUBLICATIONS

Tony C.W. Mok et. al., Unsupervised deformable image registration with absent correspondences in pre-operative and post-recurrence brain tumor mri scans. In Medical Image Computing and Computer Assisted Intervention—MICCAI 2022: 25th International Conference, Singapore, Sep. 18-22, 2022, Proceedings, Part VI, pp. 25-35. Springer, 2022.
T. Rohlfing et. al., An alternating-constraints algorithm for volume-preserving non-rigid registration of contrast-enhanced mr breast images. In Biomedical Image Registration: Second International Workshop, WBIR 2003, Philadelphia, PA, USA, Jun. 23-24, 2003. Revised Papers 2, pp. 291-300. Springer, 2003.
C.Tanner et al., Validation of volume-preserving non-rigid registration: Application to contrast-enhanced mr-mammography. Lecture Notes in Computer Science, 2002.
Di Wang et al., Population learning followed by one shot learning pulmonary image registration using tissue volume preserving and vesselness constraints. Medical Image Analysis, 2022.
Marek Wodzinski et al., Unsupervised method for intra-patient registration of brain magnetic resonance images based on objective function weighting by inverse consistency: Contribution to the brats-reg challenge. arXiv preprint arXiv:2211.07386, 2022.
Bowen Zhao et al., Tissue-Volume Preserving Deformable Image Registration for 4DCT Pulmonary Images, 2016 IEEE Conference on Computer Vision and Pattern Recognition Workshops (CVPRW), pp. 481-489, 2016.

* cited by examiner

| Network | Methods | LifTS17 | | | | | BraTS20 | | | | |
|---|---|---|---|---|---|---|---|---|---|---|---|
| | | Dice ↑ | Lm. Dist ↓ | $\|J_\phi\| < 0\%$ ↓ | Std $\|J_\phi\|$ ↓ | STSR ↓ | Dice ↑ | Lm. Dist ↓ | $\|J_\phi\| < 0\%$ ↓ | Std $\|J_\phi\|$ ↓ | STSR ↓ |
| SyN | | 0.850 | 12.36 | 0.192 | 0.251 | 1.864 | 0.9560 | 4.01 | 0.276 | 0.226 | 1.512 |
| B-Spline | | 0.853 | 14.22 | 0.003 | 0.288 | 1.330 | 0.9601 | 4.51 | 0.001 | 0.171 | 1.622 |
| VTN | Regular | 0.912 | 10.46 | 3.545 | 2.048 | 2.330 | 0.9784 | 2.96 | 0.386 | 0.725 | 2.263 |
| | Ours | 0.908 | 10.77 | 2.966 | 1.124 | 1.200 | 0.9728 | 3.10 | 0.596 | 0.285 | 1.416 |
| VXM | Regular | 0.860 | 12.62 | 4.191 | 1.699 | 1.738 | 0.9701 | 3.56 | 0.024 | 0.448 | 1.929 |
| | Ours | 0.857 | 12.45 | 1.081 | 0.991 | 1.241 | 0.9741 | 3.60 | 0.030 | 0.226 | 1.463 |
| TransMorph | Regular | 0.859 | 13.35 | 6.377 | 1.986 | 1.785 | 0.9710 | 4.03 | 0.104 | 0.468 | 1.868 |
| | Ours | 0.856 | 13.19 | 4.084 | 0.827 | 1.302 | 0.9758 | 3.98 | 0.019 | 0.194 | 1.319 |

FIG. 4

| # | Network | Unsupervised | Adaptive | Region | LiTs17 Dice↑ | Lm. Dist↓ | $|J_\phi|<0(\%)$↓ | Std.$|J_\phi|$↓ | STSR↓ |
|---|---------|--------------|----------|--------|------|-----------|--------------------|-------------------|-------|
| 1 | VTN | ✓ | - | - | 0.912 | 10.46 | 3.545 | 2.048 | 2.330 |
| 2 |  | × | × | - | 0.914 | 10.22 | 3.241 | 1.165 | 1.648 |
| 3 |  | × | × | Tumor | 0.911 | 10.74 | 2.883 | 1.017 | 1.205 |
| 4 |  | ✓ | × | Organ | 0.904 | 11.07 | 3.194 | 1.015 | 1.640 |
| 5 |  | ✓ | ✓ | Organ | 0.908 | 10.77 | 2.956 | 1.124 | 1.200 |
| 6 | VXM | ✓ | - | - | 0.860 | 12.62 | 4.191 | 1.699 | 1.738 |
| 7 |  | × | × | - | 0.863 | 12.21 | 1.603 | 0.601 | 1.417 |
| 8 |  | × | × | Tumor | 0.859 | 12.38 | 1.567 | 0.698 | 1.291 |
| 9 |  | ✓ | × | Organ | 0.856 | 12.78 | 1.635 | 0.675 | 1.407 |
| 10 |  | ✓ | ✓ | Organ | 0.857 | 12.43 | 1.681 | 0.691 | 1.241 |
| 11 | TransMorph | ✓ | - | - | 0.859 | 13.35 | 6.337 | 1.906 | 1.785 |
| 12 |  | × | × | - | 0.863 | 13.10 | 4.923 | 1.540 | 1.540 |
| 13 |  | × | × | Tumor | 0.858 | 13.21 | 4.401 | 0.877 | 1.227 |
| 14 |  | ✓ | × | Organ | 0.849 | 13.02 | 4.651 | 0.845 | 1.454 |
| 15 |  | ✓ | ✓ | Organ | 0.856 | 13.19 | 4.084 | 0.827 | 1.302 |

FIG. 5

PRESERVING TUMOR VOLUMES FOR UNSUPERVISED MEDICAL IMAGE REGISTRATION

TECHNICAL FIELD

The present disclosure generally relates to image registration for 3D medical images. In particular, the present disclosure relates to deformable registration of a moving image and a fixed image where the moving image is a medical image having one or more tumor regions, and the one or more tumor regions are preserved in volume in warping the moving image to align with the fixed image.

ABBREVIATIONS 2D two-dimensional
3D three-dimensional
CNN convolutional neural network
CT computed tomography
MR magnetic resonance
MRI magnetic resonance imaging
RCN recursive cascaded network
STM soft tumor mask
STSR square tumor size ratio
TSR tumor size ratio

BACKGROUND

Deformable image registration is a fundamental task that estimates non-linear spatial correspondences between two images. It is useful for medical image studies that involve 3D images of organs or tissues, such as MR brain scans and CT liver scans. Recently, a wide range of deep-learning based methods have been proposed in the field, with better performance and obvious speed-ups in inference time compared to the traditional registration methods [4], [35], [29], [13], [14].

Currently, most of the learning-based methods [4], [35] train a registration model to achieve high similarity in either image intensity [35], [4] or anatomy label maps [13]. While it is useful in various medical applications, such as atlas-based segmentation and image fusion [7], problems emerge, however, when studying images with tumors [3], [11], [22]. Tracking tumor growth is a core task in cancer treatment, which can be used to evaluate outcomes of radiotherapy and chemotherapy, and to plan optimal postoperative treatment [11]. The process requires registration to align anatomy of images of the patient at different periods, while preserving tumor properties, e.g., the size. Traditional models using regular registration have struggled to accomplish this task [11]. We have observed that it remains an issue for current learning-based methods, and a viable solution has yet to be proposed.

In the present disclosure, a deformable registration technique that avoids tumor volume change during registration is developed.

SUMMARY

Mathematical equations referenced in this Summary can be found in Detailed Description.

An aspect of the present disclosure is to provide a computer-implemented method for performing deformable registration of a moving image and a fixed image. The moving image is a medical image that images an organ having one or more tumor regions. Each of the moving and fixed images is a 3D image.

The method comprises performing a first computing process for generating a STM. The STM is a map of probability distribution for indicating a likelihood of an individual voxel of the organ in the moving image being located in the one or more tumor regions. The method further comprises performing a second computing process for generating a warped image. The warped image is a 3D image obtained by warping the moving image to align with the fixed image. The second computing process is a machine-learning process trainable under an objective of minimizing a training loss computed as a weighted sum of a plurality of component losses. Particularly, the plurality of component losses includes: a volume-preserving loss for measuring a loss due to failure of keeping the one or more tumor regions unchanged in volume during warping the moving image; and a weighted similarity loss for measuring a loss of similarity over a non-tumor part of the organ between the warped image and the fixed image; such that the one or more tumor regions are preserved in volume during generating the warped image from the moving image while promoting similarity in the non-tumor part between the moving image and the fixed image during aligning the moving image with the fixed image. Each of the volume-preserving loss and weighted similarity loss is computed according to at least the STM.

Preferably, the first computing process comprises: using a first registration network to generate a first deformation field used for warping the moving image to align with the fixed image; estimating a change of volume at each voxel of the organ in warping the moving image according to the first deformation field to thereby generate a first map of volume-change distribution over the organ; and mapping the first map of volume-change distribution to the map of probability distribution to thereby generate the STM.

Preferably, the first registration network is a similarity-based registration network that is modeled by a first plurality of parameters and that is trainable. The first computing process further comprises training the first registration network to fix the first plurality of parameters before using the first registration network to generate the first deformation field.

In certain embodiments, the first map of volume-change distribution over the organ is computed by EQN. (16).

In mapping the first map of volume-change distribution to the map of probability distribution, a transformation function is used to process the volume-change distance to yield a resultant probability value for the individual voxel in the map of probability distribution. In certain embodiments, the transformation function is a sigmoid function.

Preferably, the second computing process comprises: using a second registration network to generate a second deformation field used for warping the moving image to align with the fixed image, wherein the second registration network is trainable and is modeled by a second plurality of parameters; spatially transforming the moving image according to the second deformation field to generate the warped image; training the second registration network by optimizing the second plurality of parameters in a sense of minimizing the training loss; estimating a change of volume at each voxel of the organ in warping the moving image according to the second deformation field to thereby generate a second map of volume-change distribution over the organ; in computing the training loss, computing the volume-preserving loss according to the second map of volume-change distribution and the STM; and in computing the training loss, computing the weighted similarity loss according to the warped image, the fixed image and the STM.

Preferably, the plurality of component losses further includes a regularization loss for measuring a loss due to overfitting. The second computing process further comprises, in computing the training loss, computing the regularization loss according to the second deformation field.

In certain embodiments, the second map of volume-change distribution over the organ is computed by EQN. (18).

The volume-preserving loss and the weighted similarity loss may be computed by EQNS. (10) and (12), respectively. The training loss may be computed by EQN. (13).

In certain embodiments, a preregistration step is performed before performing the first computing process. The preregistration step comprises: filtering the moving image with a bilateral filter to yield a filtered moving image, wherein the bilateral filter is configured to preserve edges of the moving image and to smooth interior regions thereof; using the first registration network to register the filtered moving image and the fixed image to thereby yield a third deformation field; and spatially transforming the moving image according to the third deformation field to generate an unfiltered warped image for enabling edges of the unfiltered warped image to align with the fixed image without introducing volume changes to said edges. Furthermore, in the first computing process, the first deformation field is generated by using the first registration network to register the unfiltered warped image (instead of the moving image) and the fixed image.

Other aspects of the present disclosure are disclosed as illustrated by the embodiments hereinafter.

BRIEF DESCRIPTION OF THE DRAWINGS

FIG. 4 provides a table presenting a comprehensive comparison of the disclosed framework with two traditional methods and three learning-based methods with different network architectures.

FIG. 5 provides a table presenting the results of our evaluation of the effectiveness of various versions of volume-preserving losses.

Skilled artisans will appreciate that elements in the figures are illustrated for simplicity and clarity and have not necessarily been depicted to scale.

DETAILED DESCRIPTION

As used herein in the specification and appended claims, the term "avoid" or "avoiding" refers to any method to partially or completely preclude, avert, obviate, forestall, stop, hinder or delay the consequence or phenomenon following the term "avoid" or "avoiding" from happening. The term "avoid" or "avoiding" does not mean that it is necessarily absolute, but rather effective for providing some degree of avoidance or prevention or amelioration of consequence or phenomenon following the term "avoid" or "avoiding".

As used herein, "a 3D image" is an ordered sequence of 2D images, where the 2D images are respectively obtained at different locations along a straight line, and a plane of each 2D image is normal to the straight line. Note that a 3D image as used herein is not intended to mean a computer-generated graphic that provides a visual perception of depth to a human viewer similar to viewing a real-world object.

As used herein, "registration" of a first image and a second image or "registering" the first and second images means finding a spatial transformation (e.g., scaling, rotation and translation) that aligns the two images. "Deformable registration" of the first and second images means registering the first and second images where the spatial transformation is nonlinear. A spatially-varying deformation model may be used in carrying out the nonlinear spatial transformation.

In the context of image registration, "a moving image" (also known as "a source image") is spatially transformed, or warped, to align with "a fixed image" (also known as "a target image") to thereby form "a warped image".

Disclosed herein is a two-stage framework of unsupervised deformable registration of a moving image and a fixed image. Section 1 provides an overview of the framework. Section 2 compares the framework with existing techniques. Methodology used in the framework for registering the moving and fixed image is provided in Section 3. Section 4 provides experimental results obtained in testing the framework. Embodiments of the present disclosure are developed in Section 5 based on various aspects of the disclosed framework in Sections 1-4.

1. Overview of the Disclosed Framework

Figure 1:
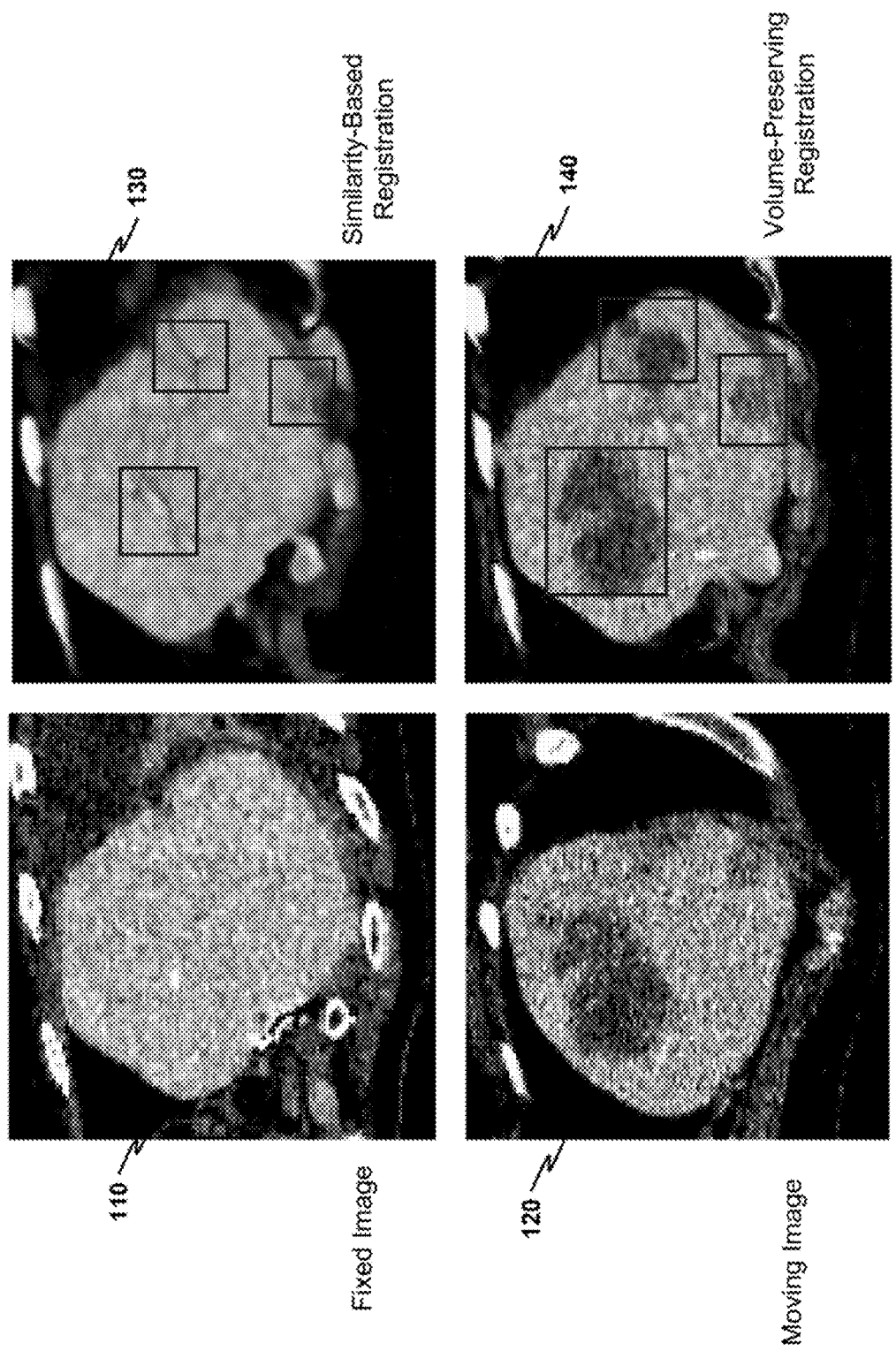
FIG. 1 depicts, as an example for illustration, a fixed image and a moving image together with a first image indicating tumor locations determined by similarity-based registration and a second image indicating corresponding tumor locations determined by volume-preserving registration using the disclosed framework.

Advantages of the disclosed framework are first illustrated with the aid of FIG. 1. FIG. 1 depicts a fixed image 110 and a moving image 120 together with a first image 130 indicating tumor locations determined by similarity-based registration and a second image 140 indicating corresponding tumor locations determined by volume-preserving registration as disclosed herein. In FIG. 1, boxes on the first and second images 130, 140 represent original locations of tumors in the moving image 120 before warped. In image registration with tumors, similarity-based registration typically leads to significant alterations in tumor size while our volume-preserving registration as disclosed herein is capable of preserving tumor anatomy. As shown in FIG. 1, the volume of tumors significantly reduces when using popular unsupervised registration networks to align tumor images with atlas images. The issue is widespread since mainstream registration networks focuses on optimizing the similarity between image pairs while ignoring tumor regions. Tumor regions often lack corresponding parts, and even for images of the same patient, the size and location of tumors may vary greatly. This can happen because tumors can change shape, size, location, or disappear over time. Therefore, in deformable settings, sizes of tumors change disproportionately to maximize the image similarity. This problem may be more severe when the registration network has better warping ability, leading to better performance in evaluations from previous works. The disproportionate change of tumor volume in deformable registration is lethal for clinical evaluation of tumor growth and greatly hinders the application of registration in clinics. The disclosed framework aims to avoid this disproportionate change of tumor volume in deformable registration.

In the present disclosure, the deformable registration problem is re-formulated as a constraint problem that preserves properties of tumors in original images, i.e. shape and size of the tumor, while maximizing image similarity in non-tumor regions. For instance, in tumor image registration with atlas, besides alignment of anatomical structures, the tumor should have similar morphing behaviors as its surrounding organ. That is, the size of the tumor should change proportionally to the size of the organ. However, it poses two major challenges. First, due to the limited availability of annotated data, most existing registration methods resort to unsupervised learning. Therefore, a key question is how to identify tumor regions in an unsupervised setting. Second, after tumor regions are identified, the challenge of preserving tumor volumes while simultaneously maximizing similarity in other regions still remains. Finding a way to balance these two competing objectives is crucial for achieving effective tumor image registration.

To tackle the above-mentioned two challenge, a novel two-stage framework that operates in an unsupervised manner is disclosed herein. In the first stage, a similarity-based registration network is leveraged to identify regions that undergo excessive volume change during registration. Such regions are indicative of the presence of tumors, as tumors tend to exhibit larger changes in volume due to a lack of correspondence between image pairs. The outcome of the first stage is a STM that distinguishes normal and possible tumor regions. In the second stage, we introduce an adaptive volume-preserving loss to train a volume-preserving registration network. Based on the STM obtained from the first stage, this loss is designed to adaptively penalize volume changes in different regions of the image. Possible tumor regions are assigned with larger loss weights, and similarity loss weights are adjusted accordingly in the opposite direction. The application of the adaptive volume preserving loss effectively balances similarity and volume preservation in different parts of the image.

It should be noted that the STM from the first stage needs not be highly accurate to achieve desirable results, as the second stage is robust, which is demonstrated by ablation experiments in Section 4. In addition to evaluating the robustness of the disclosed framework on various datasets and frameworks, including CNN and transformer, as well as different types of imaging data such as brain and abdominal, MRI and CT images, we have also introduced a STSR metric to measure the preservation of tumor volumes. The results demonstrate that the disclosed framework achieves comparable warping performance metrics such as Dice coefficient and average landmark distances while effectively preserving tumor properties as measured by the STSR.

2. Comparison of the Disclosed Framework with Related Works 2.1. Regarding Learning-Based Deformable Image Registration Compared to conventional registration methods, deep networks have achieved remarkable registration accuracy and speed using various network structures, i.e. CNN and Transformer, in applications like atlas-image registration [26], [6], [15], [5], [29], [35], [4], [13], [14], [7]. They generally adopt unsupervised learning, utilizing image similarity on either image intensities [26], [6], [5], [35] or synthesized label maps [13], [14] as well as smoothness regularization to supervise registration networks [26], [6], [5], [13], [14], [35]. However, existing methods do not adequately consider cases where tumors exist. Tumors often have no corresponding part between image pairs, and therefore, optimizing for similarity can excessively change their volumes, thus limiting the application of registration networks in critical clinical applications like cancer treatment. In the present disclosure, we study this problem with learning-based methods and propose a metric to measure volume preservation specifically for tumors.

2.2. Regarding Deformable Image Registration with Tumors

Conventional registration models often resolve registering images with tumor by: excluding the similarity measure on tumors [10], [17], which requires either massive manual segmentation [10] or initial seed to explicitly model tumor-growth [11], [17]; jointly segmenting and registering images [8], which is time-consuming since it need to iteratively detect dissimilarity in image intensities and perform resection and retraction; and reconstructing quasi-normal images from pathological ones [12], [18], which is also slow since the reconstruction need to be iteratively improved.

Recently, learning-based methods for registration with tumors [22], [20], [30] have been proposed for the release of BraTSReg dataset [3]. These methods aim to improve the spatial correspondence for non-tumor regions. Thus, these methods either directly annotate landmarks to supervise registration [20], or introduce invertibility of the registration to mask non-inverted regions and ensure high correspondence in others [22], [30]. However, these methods assume an absence of tumors in one image of the registered pair, and may not be applicable in practical applications where it is required to compare two tumor images obtained from one patient to track the tumor growth. In this scenario, invertibility in tumors is still possible and thus, it is essential to consider preservation of tumor properties during registration. The disclosed framework achieves this requirement.

2.3. Regarding Unsupervised Tumor Segmentation

To ensure preservation of tumor volumes during registration, it is crucial to first identify locations of tumors. Current deep learning methods have made remarkable progress in unsupervised tumor segmentation, as demonstrated by recent studies [31], [32], [19]. These methods typically use generative adversarial network models or simulate tumors on healthy images to generate synthetic data, which are used to train segmentation networks thereafter. Although a well-trained network can achieve high segmentation accuracy, it often requires complex training strategies and additional models or testing steps to achieve the desired performance, as noted in recent research [32], [19]. However, in our approach as disclosed in the present disclosure, we do not rely on sophisticated segmentation methods to accurately segment tumors. Instead, our experiments, as presented in Section 4, demonstrate that our tumor mask estimation is sufficient for the disclosed framework to learn a volume-preserving registration for tumors.

2.4. Regarding Volume-Preserving Deformable Image Registration

Volume-preserving registration has been studied extensively to improve the accuracy of anatomical registration. In pulmonary CT image registration, for example, tissue intensity changes between inspiration and expiration phases can be utilized as prior knowledge, and adding a volume-preserving constraint has been shown to be effective [28], [34]. In other cases, such as when soft tissues are incompressible or when images come from different modalities, a volume-preserving constraint can also serve as a helpful regularization [23], [27].

The work as disclosed in the present disclosure, instead, focuses on using volume-preservation to maintain the properties of tumors during image registration. The disclosed framework imposes this constraint adaptively on different parts of the images in order to preserve tumor volumes and ensure anatomical accuracy, whereas previous works either preserved volumes for entire images [23], [27] or used simple methods to determine the regions to be preserved [28], [34].

3. Methodology 3.1. Preliminaries

Problem Setting. Given a moving image $I_m$ and fixed image $I_f$ defined over d-dimensional (d=3 as used in here) space $\Omega$, deformable image registration aims to find a dense deformation field $\phi: \Omega \rightarrow \Omega$, which warps $I_m$ to align with $I_f$. In the present disclosure, the task is to construct a registration network $F_\theta$ that takes input $I_m$ and $I_f$ to predict the deformation field $\phi$. That is, $$\phi = F_\theta(I_m, I_f), \quad (1)$$

$$I_w(x) = I_m(\phi(x) + x), \quad (2)$$

and $$I_w \sim I_f. \quad (3)$$

Evaluation Criteria. In general, a successful deformable image registration involves accurately aligning anatomical structures while also ensuring a smooth deformation field. It is often achieved through the use of similarity-based objectives and regularization methods that promote smoothness. However, in the context of image registration with tumors, simply aligning the anatomy is not sufficient. Preserving the volume of the tumors is crucial for accurately tracking tumor growth, as previously discussed. To be specific, given the moving image $I_m$ with the tumor $T_m$ and its surrounding organ $O_m$ and the warped moving image $I_w$ with corresponding tumor $T_w$ and corresponding surrounding organ $O$, the morphing of tumor $T_m$ should be similar to that of $O_m$. Thus, in respect of volume preservation, the change of tumor size $|T_m|$ should be proportionate to the change of the containing organ $|O_m|$, i.e.:

$$TSR(I_m) = \frac{T_m}{O_m}, \quad (4)$$

and $$TSR(I_m) \approx TSR(I_w). \quad (5)$$

We therefore define a TSR as $|T|/|O|$, which should be preserved after registration. The re-formulated registration objective is now maximizing image similarity while preserving the volumes of tumors, i.e. the TSR.

3.2. Overall Framework

Figure 2:
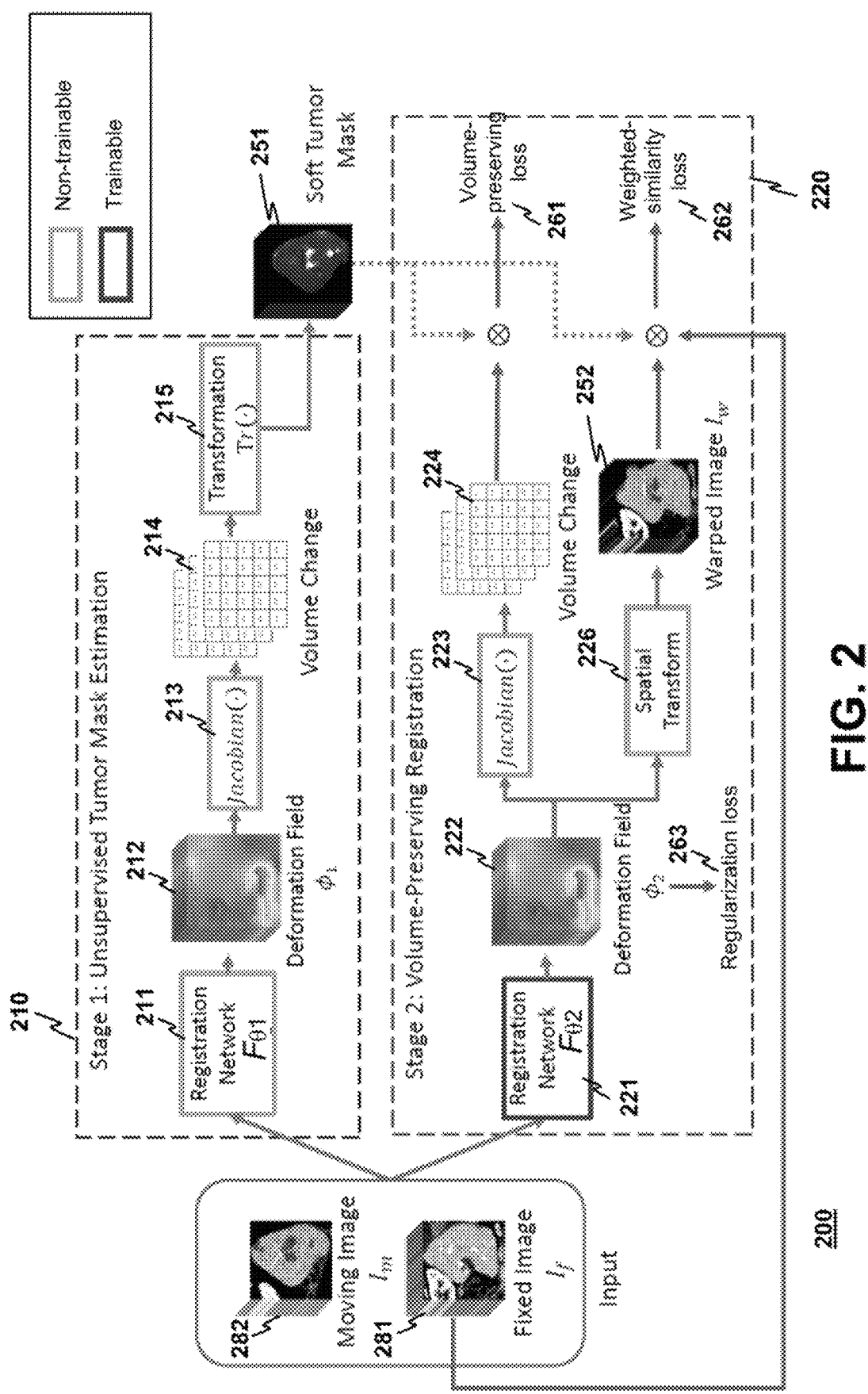
FIG. 2 exemplarily depicts a schematic diagram of a framework for unsupervised deformable registration of a moving image and a fixed image as disclosed in the present disclosure. The framework has two stages. In the first stage, a STM indicating tumor regions is estimated by analyzing the Jacobian matrix of a deformation field obtained by a registration network pre-trained on similarity loss. In the second stage, the STM is used to guide the calculation of both volume-preserving and similarity losses for training a volume-preserving registration network. This deformation field estimated by the second stage ensures both the image similarity and the preservation of tumor sizes.

FIG. 2 exemplarily depicts a schematic diagram of the framework (referenced as 200) as disclosed in the present disclosure. The disclosed framework 200 has two stages, namely, a first stage 210 of unsupervised tumor mask estimation and a second stage 220 of volume-preserving registration.

The first stage 210 estimates potential tumor regions and generates a STM 251 for indicating these tumor regions. It is done by analyzing volume changes, specifically via computing a Jacobian matrix 213, in a deformation field (referred to as a first deformation field 212) obtained by an existing similarity-based registration network 211. As tumor regions tend to undergo excessive volume change during registration, they can be identified through this analysis.

In the second stage 220, volume-preserving registration 221 is performed for tumors using an adaptive volume-preserving loss 261. This loss 261 is designed to guide the volume-preserving process effectively and is associated with the STM 251 estimated in the first stage 210. Through the assignment of distinct weights to diverse regions, including both normal and tumor regions, it is possible to preserve tumor volumes while also ensuring a high degree of similarity in other regions.

3.2.1. First Stage 210: Unsupervised Tumor Mask Estimation

Following previous works [4], [5], [35], we first train a similarity-based registration network $F_{\theta 1}$ 211 with parameters $\theta 1$ and fix its parameters. As shown in FIG. 1, tumors in medical images can be detected by analyzing a change in volume through similarity-based registration. Our goal is to utilize this characteristic to facilitate unsupervised estimation of the STM 251 for volume preservation during registration.

To determine the volume change at voxel x, we calculate the determinant of the Jacobian matrix 213 ($J_\theta$) of the first deformation field 212 computed under model parameters $\theta$. (In the first stage 210, $\theta$ is given by $\theta 1$.) Our objective is to ensure that the volume change 214 in each point of the tumor region is similar to the volume change of the organ, which is an indicator of the organ's size change (as shown in EQN. (6) as shown below). To measure the distance of volume change between the two, we calculate the number of times one ratio exceeds another, denoted as $D_1$, using EQNS. (8) and (7). EQNS. (6)-(8) are given by $$\frac{|T_w|}{|O_w|} \Big/ \frac{|T_m|}{|O_m|} \approx 1 \Rightarrow \frac{|T_w|}{|T_m|} \Big/ \frac{|O_w|}{|O_m|} \approx 1, \text{ from } EQN. (5), \quad (6)$$

-continued $$D'_\theta(x) = |J_{\theta(x)}| \Big/ \frac{|O_w|}{|O_m|}, x \in \Omega, \quad (7)$$

and $$D_\theta(x) = \max(D'_\theta(x), 1/D'_\theta(x)). \quad (8)$$

Note that $D_\theta(x)$ is a volume-change distance for the voxel x as computed from a deformation field obtained under the parameters. In the first stage 210, $D_\theta(x)$ is computed under $\theta=\theta1$. EQN. (8) is also applicable in the second stage 220, giving $D_\theta(x)$ computed under $\theta=\theta2$.

In practice, we estimate the organ masks $O_m$ and $O_w$ by warping a reference image with the ground truth organ segmentation. The reference image may be randomly selected from the training dataset, and the choice of reference image does not significantly impact the results because registration for organs achieves high accuracy, as evidenced by results in dice value as listed in a table shown in FIG. 4. By warping the reference image, we obtain the organ segmentation for the moving image $O_m$. We then calculate the organ segmentation for the warped image $O_w$.

To obtain the STM 251 from the distance $D_{\theta1}$ 214 as defined by EQN. (8) under $\theta=\theta1$, we use a transformation function Tr 215. This function 215 can be formulated as $$STM(x) = Tr(D_{\theta1}(x)) \quad (9)$$

where $D_{\theta1}(x)$ 214 represents the distance value at voxel x, and Tr 215 transforms values from the range of $[1, \infty)$ to the range of $[0,1]$. A value of 1 indicates the presence of a tumor, while a value of 0 indicates a normal region. It follows that the STM 251 can be regarded as a map of probability distribution indicating a likelihood that an individual voxel is a tumor. In practical implementation, we use $Tr(x)=\text{sigm}(5\cdot(x-1.5))$ since the sigmoid function is widely adopted for converting values to the range of $[0,1]$ and to our experience, the size of tumor regions averagely changes around 1.5 times. However, this choice of the transformation function 215 is not exclusive, as demonstrated in our experiments in Section 4. We also set the regions outside the organ mask to 0.

3.2.2. Second Stage 220: Volume-Preserving Registration for Tumors

After obtaining the STM 251, we can adaptively select tumor regions to maintain the size ratio. Here, we define the volume-preserving loss 261 by making use of the volume-change distance $D_{\theta2}(x)$ as shown in EQN. (8) computed under $\theta=\theta2$. By minimizing the distance, we can achieve smaller volume changes, indicating better preservation of tumor volume. The volume-preserving loss 261 is multiplied by the STM 251. It ensures that the volume-preserving constraints are adaptively applied to the tumor regions and not to the normal regions, which can be formulated as:

$$L_{VP} = \frac{1}{|I_m|} \sum_{x \in \Omega} D_{\theta2}(x) \cdot STM(x), \quad (10)$$

where: $STM(x)$ is a value of the STM for a voxel x of the organ in the moving image; and $|I_m|$ is a volume of the moving image. Here, in the second stage, the registration network takes the STM 251 as input, which serves as an indicator for the regions that need to be preserved in terms of volume. We follow the similarity and regularization loss formulation in [35], but we use a weighted similarity loss to adapt to the volume-preserving loss, which can be formulated as:

$$Cov'[I_w, I_f] = \frac{\sum_{x \in \Omega}(I_w(x) - \overline{I_w})(I_f(x) - \overline{I_f})(1 - STM(x))}{\sum_{x \in \Omega}(1 - STM(x))} \quad (11)$$

and $$L_{w\_sim} = \frac{Cov'[I_w, I_f]}{\sqrt{Cov[I_w, I_w] \cdot Cov[I_f, I_f]}}, \quad (12)$$

where: $\overline{I_w}$ is a mean of $I_w$; $I_w(x)$ is a value of $I_w$ at the voxel x; $\overline{I_f}$ is a mean of $I_f$; $I_f(x)$ is a value of $I_f$ at the voxel x; $Cov'[I_w, I_f]$ is a weighted covariance of $I_w$ and $I_f$ with the STM as a weight; $Cov[I_w, I_w]$ is a covariance of $I_w$; and $Cov[I_f, I_f]$ is a covariance of $I_f$.

Therefore, the training loss of the second stage 220, denoted as L, is given by $$L = L_{w\_sim} + \alpha_1 \cdot L_{VP} + \alpha_2 \cdot L_{reg}, \quad (13)$$

where $\alpha_1$ and $\alpha_2$ are hyperparameters that control the relative importance of the volume-preserving loss and the regularization loss.

3.2.3. Preregistration

Figure 3:
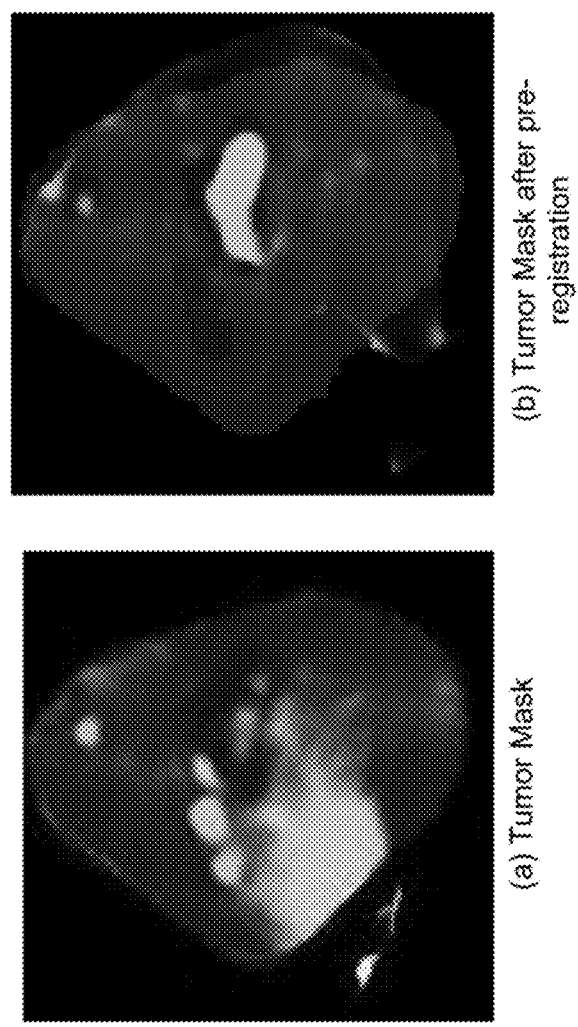
FIG. 3 provides an example for visualizing the STM with and without performing a preregistration step before the STM is generated, where image (a) is an estimated STM without pre-registration and image (b) is the one with pre-registration.

We observe that some normal regions, particularly those close to the organ boundary, may also exhibit some volume changes after registration. As a result, these regions may be incorrectly included in the STM 251, as shown in image (a) in FIG. 3. To address this issue, we introduce a preregistration step to first align the edges and exclude volume changes caused by edge alignment. Specifically, in the preregistration step, a bilateral filter is applied to the moving image 282, which preserves the edges while smoothing the interior regions. We then use the registration network 211 to register the filtered moving image with the fixed image 281 in order to align their edges. After this, an unfiltered warped image is obtained by spatially transforming the unfiltered moving image with the deformation field. The first stage 210 of the framework 200 is then performed on the unfiltered warped image, which is focused on the registration of interior regions and is able to accurately estimate a tumor mask, as shown in image (b) in FIG. 3. Therefore, this pre-registration approach effectively selects the tumor regions while filtering out the non-tumor regions.

4. Experiments 4.1. Experimental Settings

Implementation. Following the implementation of RCN [35], we employed PyTorch™ and utilized the same similarity loss and regularization losses (for affine and deformable, respectively) for baseline methods. The weight of the volume-preserving losses is set to 0.1 while the weights of similarity loss is 1 and regularization loss is 0.1. Models were trained on one NVIDIA™ GeForce RTX 3090 GPU with a batch size of 4. During the training stage, we used the Adam™ optimizer [33] and ran for a total of 5 epochs, with 20000 iterations in each epoch. The learning rate was set to $10^{-4}$.

Baselines. We re-implemented our framework on three SOTATM learning-based models that have distinct network architectures: 1) recursive cascaded network with VTN base network (VTN) [35], which stacks CNN networks to achieve higher registration accuracy; 2) VoxelMorph™ [4], which is a widely used CNN network that utilize stationary vector field to register images; 3) TransMorph™ [5], which is a well-performed hybrid Transformer-ConvNet network. We fit these learning-based networks into our framework with minor efforts and achieve good performance. Additionally, we compare our proposed method with two state-of-the-art traditional methods for deformable image registration, SyN [1] (integrated in ANTs [2] with the affine stage) and B-spline [24] (integrated in Elastix™ [16] with the affine stage) following [35].

Evaluation Metrics. The evaluation of the proposed framework is composed of five metrics: Dice score, landmark distance to measure the anatomical alignment, and Square Tumor Size Ratio metric to measure the volume preservation of tumors. More specifically, the Dice score is calculated using the following formula:

$$\text{Dice}(I_1, I_2) = \frac{2|I_1 \cap I_2|}{|I_1| + |I_2|}. \tag{14}$$

Additionally, we also use landmark annotations to measure the anatomical alignment between the warped image and the fixed image. We calculate the average distance between the fixed image's landmarks and the warped landmarks of the moving image, as also introduced in RCN [35]. To quantify the diffeomorphism and smoothness of the deformation fields, we followed the methodology of previous works such as [6], [5], [36]. Here, two metrics were employed: the average percentage of voxels with non-positive Jacobian determinant ($|J_\theta|<0\%$) in the deformation fields, and the standard deviation of the Jacobian determinant (Std. $|J_\theta|$).

To measure the volume preservation of tumors, we propose STSR, which is calculated from the change of TSR defined in EQN. (4):

$$STSR = \max\left(\left(\frac{TSR(I_m)}{TSR(I_w)}\right), \left(\frac{TSR(I_w)}{TSR(I_m)}\right)\right)^2. \tag{15}$$

Here, $I_m$ and $I_w$ refers to the moving image and the warped moving image. The square term is used to account for larger changes in tumor volumes, which can have a more significant impact on the accuracy of tumor growth estimation in clinical applications. By utilizing the STSR metric, we are able to accurately evaluate the performance of our proposed framework.

Preprocessing. In our study, we follow standard preprocessing steps as outlined in VTN [36] and VoxelMorph™ [4]. The raw scans are resampled into 128×128×128 voxels after cropping any unnecessary areas around the target object.

4.2. Datasets

Training. To train our model, we utilized two publicly available datasets: (1) LiTS17 [9]: The LiTS dataset comprises 201 CT scans that were acquired using various CT scanners and devices. The resolution of the images in this dataset ranges from 0.56 mm to 1.0 mm in the axial direction and from 0.45 mm to 6.0 mm in the z direction. The number of slices in the z direction ranges from 42 to 1026. (2) BraTS20 [21]: It consists of 369 MRI scans of brain tumors, each with ground truth segmentation of four different tumor components. For training our neural network, we utilized the T1ce modality and treated all four components as tumors, while considering the entire brain as the surrounding organ.

Testing. For testing, we utilized a set of 10 cases of CT liver scans with metastatic tumors, and 10 MRI brain scans with metastatic tumors. The modality of MRI brain scans is T1ce. Each case included both pre- and post-treatment images of the same patients, resulting in a total of 20 scans for each set. Following [25], the segmentation of the scans, which contains the organ (liver or brain) and the tumor inside, were carefully annotated by three experts in the field. Landmarks were also annotated by three experts in the field to evaluate the registration accuracy of our framework.

4.3. Results and Ablation Study

4.3.1. Quantitative Comparison

FIG. 4 provides a table presenting a comprehensive comparison of our proposed framework with two traditional methods and three learning-based methods with different network architectures (CNN, cascaded CNN and hybrid transformer-CNN). We compare the methods using a similarity-based manner (regular) following the settings in [35], as well as our volume-preserving manners. Our results demonstrate that our proposed framework outperforms all other methods in terms of the STSR metrics, while achieving comparable results in Dice and Landmark Dist, and often better results in folding detection ($|J_\theta|<0$) and smoothness quality (Std. $|J_\theta|$). Furthermore, we observe that registration networks that achieve better performance in terms of previous metrics such as Dice tend to have worse performance in preserving tumor volumes (STSR). This observation highlights the need to balance these two objectives in order to achieve competitive results.

4.3.2. Volume-Preserving Losses

FIG. 5 provides a table presenting the results of our evaluation of the effectiveness of various versions of volume-preserving losses. For each sub-table, the first row (#1, #6, and #11) represents using only the similarity loss, while the second row (#2, #7, and #12) utilizes the ground truth as a weighted similarity loss. The third row (#3, #8, and #13) uses the ground truth binary mask as a tumor mask, while the fourth row (#4, #9, and #14) uses the mask of the entire organ as a tumor mask. The fifth row (#5, #10, and #15) represents our proposed framework.

By comparing the first and second rows of each sub-table with the fifth row, we observe that our proposed volume-preserving loss can effectively preserve details and achieve superior performance across various metrics. The improvement from the third and fourth rows to the fifth row indicates the importance of adaptiveness in preserving the volume of the organ and tumor, respectively. It should be noted that we do not require pixel-wise ground truth for tumor volume preservation.

4.3.3. Robustness to Tumor Mask Estimation

Figure 6:
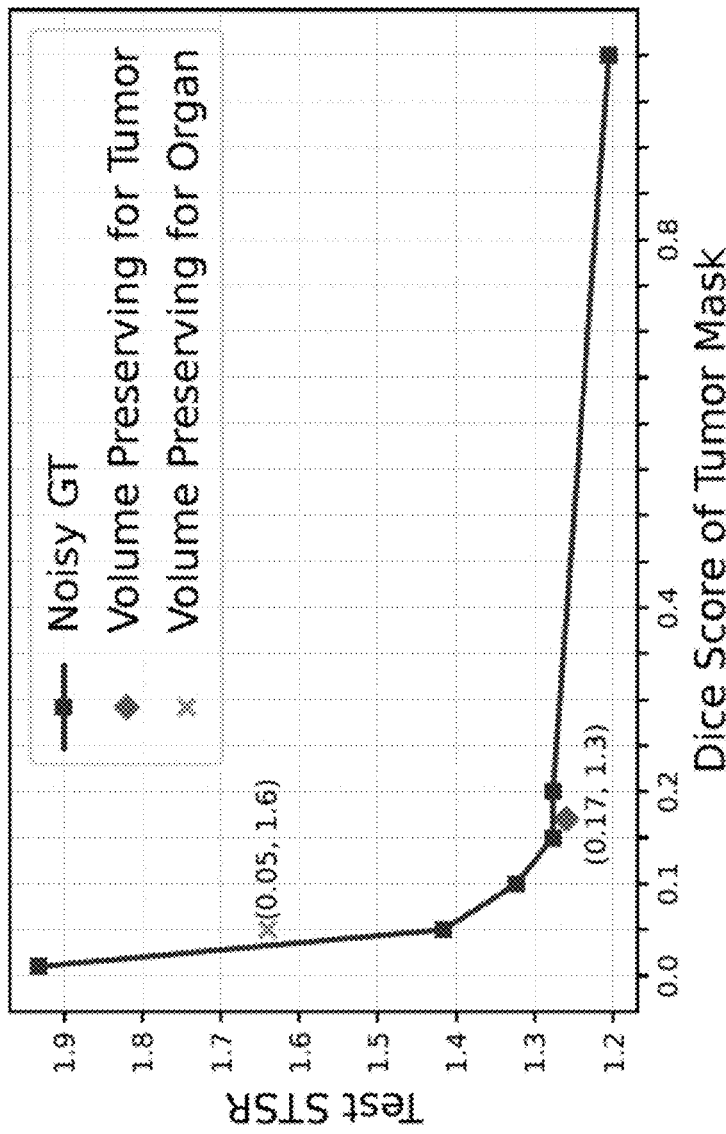
FIG. 6 illustrates robustness of the disclosed framework in the presence of noisy ground truth segmentation masks.

In FIG. 6, we showcase the robustness of the disclosed framework in the presence of noisy ground truth segmentation masks. To evaluate this, we randomly selected points within organs to ensure that tumors had a certain Dice score with respect to the ground truth segmentation of tumors. As depicted in the FIG. 6, despite variations in the noisy ground truth segmentation masks, the disclosed framework's performance remains consistent. Specifically, when the tumor mask has a Dice score above a certain threshold, such as 0.15, the estimated tumor mask consistently achieves a Dice score of approximately 0.17. In contrast, using the whole organ as mask in volume-preserving loss causes degradation in performance as it only has a dice score of roughly 0.05.

This highlights the necessity and efficiency of the STM estimation in the first stage 210.

5. Details of Embodiments of Present Disclosure

Embodiments of the present disclosure are elaborated as follows based on the details, examples, applications, etc., of the two-stage framework 200 for solving the deformable registration problem as disclosed above.

An aspect of the present disclosure is to provide a computer-implemented method for performing deformable registration of a moving image and a fixed image. The moving image is a medical image that images an organ having one or more tumor regions. Each of the moving and fixed images is a 3D image.

Figure 7:
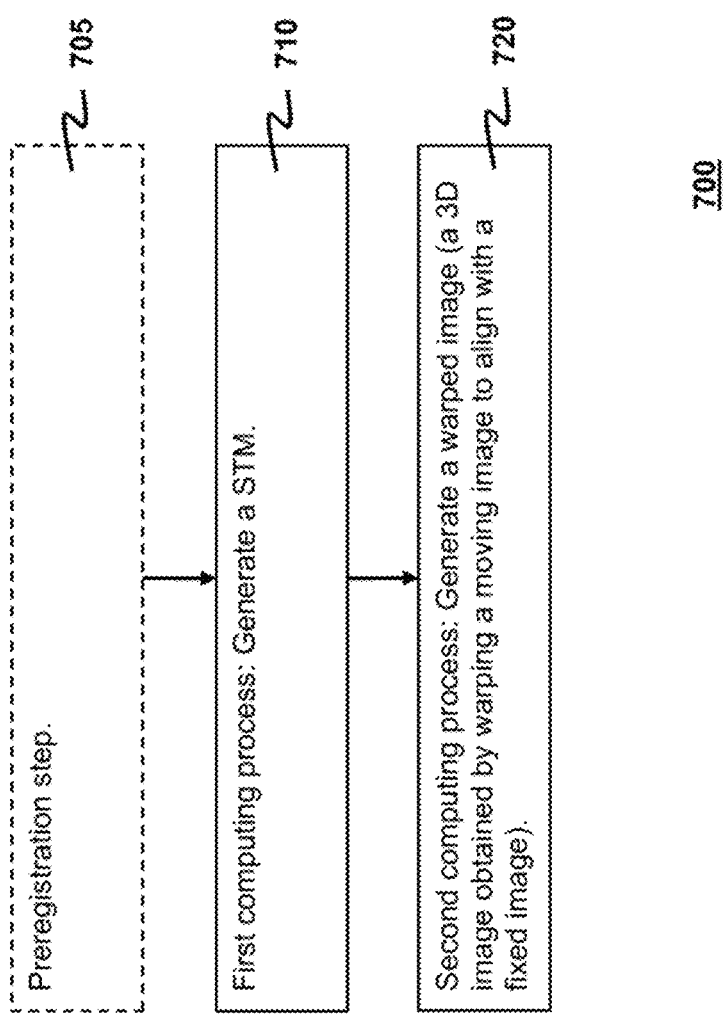
FIG. 7 depicts a flowchart showing exemplary steps of a computer-implemented method, developed based on the disclosed framework, for performing deformable registration of a moving image and a fixed image.

The disclosed method is illustrated with the aid of FIGS. 7 and 2. FIG. 7 depicts a flowchart showing exemplary steps of the disclosed method (referenced as 700).

Exemplarily, the method 700 comprises performing a first computing process 710 and a second computing process 720. The first computing process 710 and the second computing process 720 correspond to the first stage 210 and the second stage 220, respectively.

The first computing process 710 is arranged to generate a STM 251. The STM 251 is a map of probability distribution for indicating a likelihood of an individual voxel of the organ in the moving image 282 being located in the one or more tumor regions.

The second computing process 720 is arranged to generate a warped image 252. The warped image 252 is a 3D image obtained by warping the moving image 282 to align with the fixed image 281. The second computing process 720 is a machine-learning process trainable under an objective of minimizing a training loss. The training loss is computed as a weighted sum of a plurality of component losses. See EQN. (13). The plurality of component losses includes a volume-preserving loss 261 and a weighted similarity loss 262. The volume-preserving loss 261 is used for measuring a loss due to failure of keeping the one or more tumor regions unchanged in volume during warping the moving image 282. The weighted similarity loss 262 is for measuring a loss of similarity over a non-tumor part of the organ between the warped image 252 and the fixed image 281. Note that each of the volume-preserving loss 261 and weighted similarity loss 262 is computed according to at least the STM 251. By including the volume-preserving loss 261 and the weighted similarity loss 262 in computing the training loss, which is minimized in training the second computing process 720, the second computing process 720 after training is advantageously configured such that the one or more tumor regions are preserved in volume during generating the warped image 252 from the moving image 282 while promoting similarity in the non-tumor part between the moving image 282 and the fixed image 281 during aligning the moving image 282 with the fixed image 281.

Figure 8:
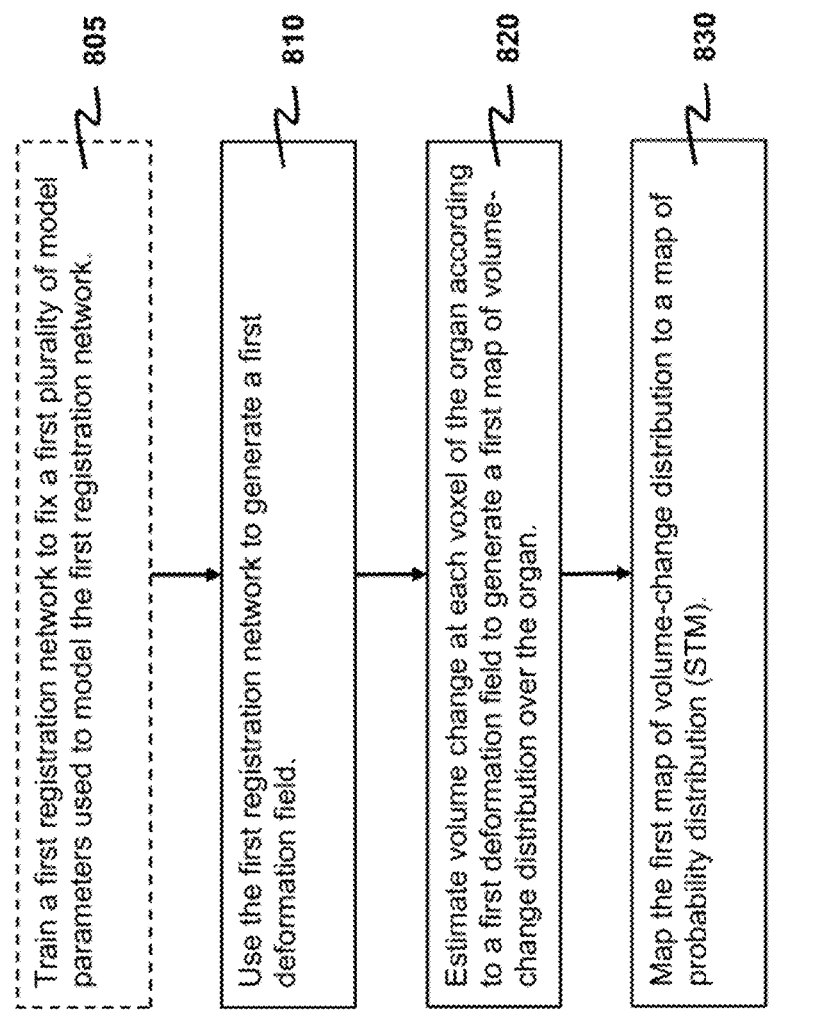
FIG. 8 depicts a flowchart showing preferable steps used in a first computing process of the disclosed method in accordance with the first stage of the disclosed framework.

FIG. 8 depicts a flowchart of steps used in a preferred embodiment of the first computing process 710 in accordance with the first stage 210 of the disclosed framework 200. Adopting the procedure of the first stage 210 to the first computing process 710 enables the first computing process 710 to advantageously achieve unsupervised tumor estimation without involving a sophisticated segmentation algorithm such as segmentation techniques of [32] and [19]. The first computing process 710 comprises steps 810, 820 and 830. In the step 810, a first registration network 211 is used to generate a first deformation field 212. The first deformation field 212 is a dense deformation field used for warping the moving image 282 to align with the fixed image 281. After the first deformation field 212 is generated, a change of volume at each voxel of the organ in warping the moving image 282 is estimated in the step 820 according to the first deformation field 212. As a result, a first map of volume-change distribution 214 over the organ is generated in the step 820. In the step 830, the first map of volume-change distribution 214 is mapped to a first map of probability distribution 214 to thereby generate the STM 251.

Preferably, the first registration network 211 is a similarity-based registration network that is modeled by a first plurality of parameters and that is trainable. The first computing process 710 further comprises a step 805 of training the first registration network 211 to fix the first plurality of parameters before using the first registration network 211 to generate the first deformation field 212 in the step 810.

In certain embodiments, the first map of volume-change distribution 214 over the organ is computed by $$D_{\theta 1}(x) = \max(D'_{\theta 1}(x), 1/D'_{\theta 1}(x)), x \in \Omega, \quad (16)$$

in which $$D'_{\theta 1}(x) = |J_{\theta 1(x)}|/\beta \quad (17)$$

where: $D_{\theta 1}(x)$ denotes a volume-change distance taken from the first map of volume-change distribution 214 and computed for a voxel x of the organ in the moving image 182; $\Omega$ stands for a 3D space; $|J_{\theta 1(x)}|$ is a Jacobian determinant 213 of the first deformation field 212 with the Jacobian determinant 213 computed for the voxel x; and $\beta$ is a predicted ratio of a first volume of the organ in the warped image 252 to a second volume of the organ in the moving image 282. Note that EQNS. (16) and (17) are adapted from EQNS. (8) and (7), respectively. As seen from EQN. (7), $\beta$ is a predicted value and is given by $\beta=|O_w|/|O_m|$ where the organ masks $O_m$ and $O_w$ are predicted/estimated by warping a reference image, randomly selected from a training dataset, with a ground truth organ segmentation.

In mapping the first map of volume-change distribution 214 to the map of probability distribution (i.e. the STM 251), a transformation function 215 is used to process the volume-change distance to yield a resultant probability value for the individual voxel in the map of probability distribution. In certain embodiments, the transformation function 215 is a sigmoid function. In certain embodiments, the transformation function 215 is selected to be $Tr(x)=\text{sigm}(5\cdot(x-1.5))$.

Figure 9:
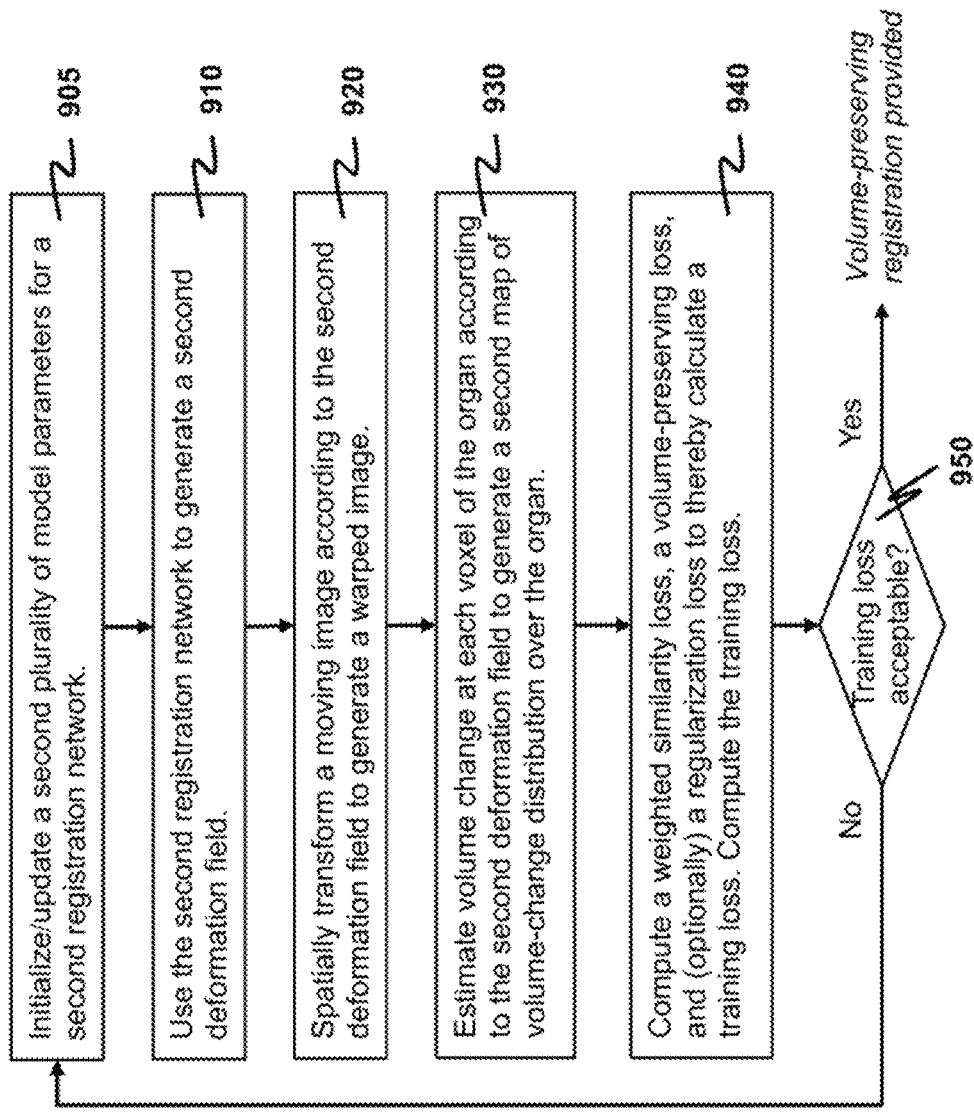
FIG. 9 depicts a flowchart showing preferable steps used in a second computing process of the disclosed method in accordance with the second stage of the disclosed framework.

FIG. 9 depicts a flowchart of steps used in a preferred embodiment of the second computing process 720 in accordance with the second stage 220 of the disclosed framework 200 for volume-preserving registration. The second computing process 720 comprises steps 905, 910, 920, 930, 940 and 950. The second computing process 720 is realized as an iterative process.

In the second computing process 720, a second registration network 221 is used to register the moving image 282 and fixed image 281. The second registration network 221 is trainable and is modelled by a second plurality of model parameters.

In the step 905, the second plurality of model parameters is initialized or updated.

The second registration network 221 is then used in the step 910 to generate a second deformation field 222 used for warping the moving image 282 to align with the fixed image 281.

In the step 920, the moving image 282 is spatially transformed to generate the warped image 252 according to the second deformation field 222. See EQN. (2) for performing the spatial transformation 226.

Apart from generating the warped image 252, the second deformation field 222 is also used to generate a second map of volume-change distribution 224. In the step 930, a change of volume at each voxel of the organ in warping the moving image 282 is estimated according to the second deformation field 222 to thereby generate the second map of volume-change distribution 224 over the organ.

In the step 940, the volume-preserving loss 261 is computed according to the second map of volume-change distribution 224 and the STM 251; the weighted similarity loss 262 is computed according to the warped image 252, the fixed image 281 and the STM 251; and the training loss is computed from the plurality of component losses.

The training loss is checked in the step 950 to determine if the optimization constraint of minimizing the training loss is considered satisfied. If the constraint is satisfied, then the obtained warped image 252 is an end result of volume-preserving registration of the moving image 182 and the fixed image 181; otherwise, the steps 905, 910, 920, 930, 940 and 950 are repeated where the step 905 is executed to update the second plurality of model parameters in a direction of reducing the training loss.

The steps 905 and 950 collectively constitute an action of training the second registration network 221 by optimizing the second plurality of parameters in a sense of minimizing the training loss.

Preferably, the plurality of component losses further includes a regularization loss 263 for measuring a loss due to overfitting. The regularization loss 263 is additionally computed in the step 940 according to the second deformation field 222.

In certain embodiments, the second map of volume-change distribution 224 over the organ is computed by $$D_{\theta 2}(x) = \max(D'_{\theta 2}(x), 1/D'_{\theta 2}(x)), x \in \Omega, \quad (18)$$

in which $$D'_{\theta 2}(x) = |J_{\theta 2(x)}|/\beta \quad (19)$$

where: $D_{\theta 2}(x)$ denotes a volume-change distance taken from the second map of volume-change distribution 224 and computed for a voxel x of the organ in the moving image 182; $\Omega$ stands for a 3D space; $|J_{\theta 2(x)}|$ is a Jacobian determinant 223 of the second deformation field 222 with the Jacobian determinant 223 computed for the voxel x; and $\beta$, as mentioned above, is the predicted ratio of the first volume of the organ in the warped image 252 to the second volume of the organ in the moving image 282.

For various component losses, the volume-preserving loss 261 and the weighted similarity loss 262 may be computed by EQNS. (10) and (12), respectively. The training loss may be computed by EQN. (13).

Figure 10:
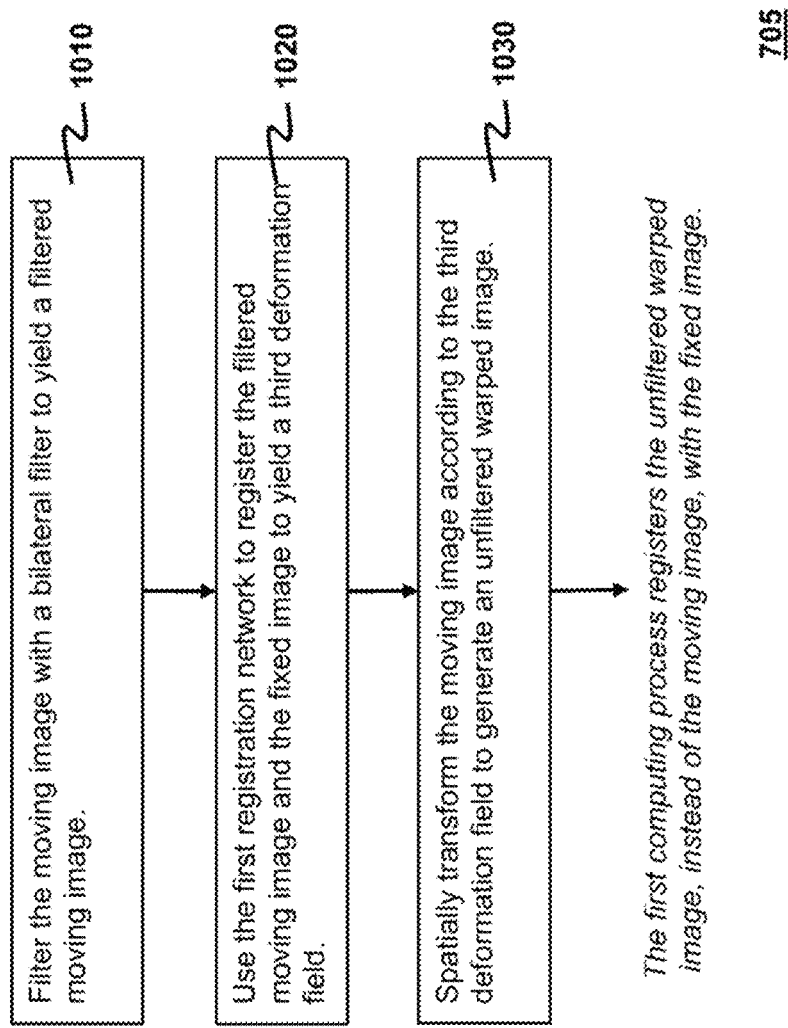
FIG. 10 depicts a flowchart showing exemplary steps taken in an optional preregistration step performed before the first computing process.

In certain embodiments of the method 700, a preregistration step 705 (as shown in FIG. 7) is performed before the first computing process 710 is performed. FIG. 10 depicts a flowchart showing exemplary steps taken in the preregistration step 705. In step 1010, the moving image 282 is first filtered with a bilateral filter to yield a filtered moving image. The bilateral filter is configured to preserve edges of the moving image and to smooth interior regions thereof. In step 1020, the first registration network 211 is used to register the filtered moving image and the fixed image 281 to thereby yield a third deformation field (not shown in FIG. 2). Afterwards, in step 1030, the moving image 282 is spatially transformed according to the third deformation field to generate an unfiltered warped image. See EQN. (2) for performing the spatial transformation. The step 1030 gives an advantage of enabling edges of the unfiltered warped image to align with the fixed image 281 without introducing volume changes to the aforesaid edges. After the unfiltered warped image is obtained, the first computing process 710 can be performed. In the first computing process 710, the first deformation field 212 is generated by using the first registration network 211 to register the unfiltered warped image (instead of the moving image 282) and the fixed image 281.

The present disclosure may be embodied in other specific forms without departing from the spirit or essential characteristics thereof. The present embodiment is therefore to be considered in all respects as illustrative and not restrictive. The scope of the invention is indicated by the appended claims rather than by the foregoing description, and all changes that come within the meaning and range of equivalency of the claims are therefore intended to be embraced therein.

REFERENCES

There follows a list of references that are occasionally cited in the specification. Each of the disclosures of these references is incorporated by reference herein in its entirety.

[1] Brian B Avants, Charles L Epstein, Murray Grossman, and James C Gee. Symmetric diffeomorphic image registration with cross-correlation: evaluating automated labeling of elderly and neurodegenerative brain. *Medical image analysis*, 12(1):26-41, 2008.

[2] Brian B Avants, Nick Tustison, Gang Song, et al. Advanced normalization tools (ants). *Insight j*, 2(365): 1-35, 2009.

[3] Bhakti Baheti, Diana Waldmannstetter, Satrajit Chakrabarty, Hamed Akbari, Michel Bilello, Benedikt Wiestler, Julian Schwarting, Evan Calabrese, Jeffrey Rudie, Syed Abidi, et al. The brain tumor sequence registration challenge: establishing correspondence between pre-operative and followup mri scans of diffuse glioma patients. *arXiv preprint arXiv:*2112.06979, 2021.

[4] Guha Balakrishnan, Amy Zhao, Mert R Sabuncu, John Guttag, and Adrian V Dalca. An unsupervised learning model for deformable medical image registration. In *Proceedings of the IEEE conference on computer vision and pattern recognition*, pages 9252-9260, 2018.

[5] Junyu Chen, Eric C Frey, Yufan He, William P Segars, Ye Li, and Yong Du. Transmorph: Transformer for unsupervised medical image registration. *Medical image analysis*, 82:102615, 2022.

[6] Jiashun Chen, Donghuan Lu, Yu Zhang, Dong Wei, Munan Ning, Xinyu Shi, Zhe Xu, and Yefeng Zheng. Deformer: Towards displacement field learning for unsupervised medical image registration. In *Medical Image Computing and Computer Assisted Intervention–*

MICCAI 2022: 25th International Conference, Singapore, Sep. 18-22, 2022, Proceedings, Part VI, pages 141-151. Springer, 2022.

[7] Xiang Chen, Yan Xia, Nishant Ravikumar, and Alejandro F Frangi. Joint segmentation and discontinuity-preserving deformable registration: Application to cardiac cine-mr images. *arXiv preprint arXiv:2211.13828*, 2022.

[8] Nicha Chitphakdithai and James S. Duncan. Non-rigid registration with missing correspondences in preoperative and postresection brain images. *Lecture Notes in Computer Science*, 2010.

[9] Patrick Christ. Lits—liver tumor segmentation challenge (lits17). 2017.

[10] Olivier Clatz, Hervé Delingette, Ion-Florin Talos, Alexandra J. Golby, Ron Kikinis, Ferenc A. Jolesz, Nicholas Ayache, and Simon K. Warfield. Robust non-rigid registration to capture brain shift from intraoperative mri. *IEEE Transactions on Medical Imaging*, 2005.

[11] Ahmed Elazab, Yousry M Abdulazeem, Ahmed M Anter, Qingmao Hu, Tianfu Wang, and Baiying Lei. Macroscopic cerebral tumor growth modeling from medical images: A review. *IEEE Access*, 6:30663-30679, 2018.

[12] Xu Han, Xiao Yang, Stephen R. Aylward, Roland Kwitt, and Marc Niethammer. Efficient registration of pathological images: A joint pca/image-reconstruction approach. *arXiv: Computer Vision and Pattern Recognition*, 2017.

[13] Malte Hoffmann, Benjamin Billot, Douglas N Greve, Juan Eugenio Iglesias, Bruce Fischl, and Adrian V Dalca. Synthmorph: learning contrast-invariant registration without acquired images. *IEEE transactions on medical imaging*, 41(3):543-558, 2021.

[14] Malte Hoffmann, Andrew Hoopes, Douglas N Greve, Bruce Fischl, and Adrian V Dalca. Anatomy-aware and acquisition-agnostic joint registration with synthmorph. *arXiv preprint arXiv:230.11329*, 2023.

[15] Boah Kim, Dong Hwan Kim, Seong Ho Park, Jieun Kim, June-Goo Lee, and Jong Chul Ye. Cyclemorph: cycle consistent unsupervised deformable image registration. *Medical image analysis*, 71:102036, 2021.

[16] Stefan Klein, Marius Staring, Keelin Murphy, Max A Viergever, and Josien P W Pluim. Elastix: a toolbox for intensity-based medical image registration. *IEEE Transactions on Medical Imaging*, 29(1):196-205, 2009.

[17] Dongjin Kwon, Marc Niethammer, Hamed Akbari, Michel Bilello, Christos Davatzikos, and Kilian M. Pohl. Portr: Preoperative and post-recurrence brain tumor registration. *IEEE Transactions on Medical Imaging*, 2014.

[18] Dongjin Kwon, Ke Zeng, Michel Bilello, and Christos Davatzikos. Estimating patient specific templates for preoperative and follow-up brain tumor registration. *Lecture Notes in Computer Science*, 2015.

[19] Fei Lyu, Mang Ye, Andy J Ma, Terry Cheuk-Fung Yip, Grace Lai-HungWong, and Pong C Yuen. Learning from synthetic ct images via test-time training for liver tumor segmentation. *IEEE Transactions on Medical Imaging*, 41(9):2510-2520, 2022.

[20] Mingyuan Meng, Lei Bi, Dagan Feng, and Jinman Kim. Brain tumor sequence registration with non-iterative coarse-to-fine networks and dual deep supervision. *arXiv preprint arXiv:2211.07876*, 2022. 3

[21] Bjoern H Menze, Andras Jakab, Stefan Bauer, Jayashree Kalpathy-Cramer, Keyvan Farahani, Justin Kirby, Yuliya Burren, Nicole Porz, Johannes Slotboom, Roland Wiest, et al. The multimodal brain tumor image segmentation benchmark (brats). *IEEE Transactions on Medical Imaging*, 34(10):1993-2024, 2014.

[22] Tony C W Mok and Albert C S Chung. Unsupervised deformable image registration with absent correspondences in pre-operative and post-recurrence brain tumor mri scans. In *Medical Image Computing and Computer Assisted Intervention-MICCAI 2022: 25th International Conference, Singapore, Sep. 18-22, 2022, Proceedings, Part VI*, pages 25-35. Springer, 2022.

[23] Torsten Rohlfing, Calvin R Maurer, David A Bluemke, and Michael A Jacobs. An alternating-constraints algorithm for volume-preserving non-rigid registration of contrast-enhanced mr breast images. In *Biomedical Image Registration: Second International Workshop, WBIR 2003, Philadelphia, PA, USA, Jun. 23-24, 2003. Revised Papers 2*, pages 291-300. Springer, 2003.

[24] Daniel Rueckert, Luke I Sonoda, Carmel Hayes, Derek L G Hill, Martin O Leach, and David J Hawkes. Nonrigid registration using free-form deformations: application to breast mr images. *IEEE Transactions on Medical Imaging*, 18(8):712-721, 1999.

[25] Siyuan Shan, Wen Yan, Xiaoqing Guo, Eric I Chang, Yubo Fan, Yan Xu, et al. Unsupervised end-to-end learning for deformable medical image registration. *arXiv preprint arXiv:1711.08608*, 2017.

[26] Jiacheng Shi, Yuting He, Youyong Kong, Jean-Louis Coatrieux, Huazhong Shu, Guanyu Yang, and Shuo Li. Xmorpher: Full transformer for deformable medical image registration via cross attention. In *Medical Image Computing and Computer Assisted Intervention-MICCAI 2022: 25th International Conference, Singapore, Sep. 18-22, 2022, Proceedings, Part VI*, pages 217-226. Springer, 2022.

[27] Christine Tanner, Julia A. Schnabel, Andreas Degenhard, Andy D. Castellano-Smith, Carmel Hayes, Martin O. Leach, D. R. Hose, Derek L. G. Hill, and David J. Hawkes. Validation of volume-preserving non-rigid registration: Application to contrast-enhanced mr-mammography. *Lecture Notes in Computer Science*, 2002.

[28] Di Wang, Yue Pan, Oguz C. Durumeric, Joseph M. Reinhardt, Eric A. Hoffman, Joyce D. Schroeder, and Gary E. Christensen. Plosl: Population learning followed by one shot learning pulmonary image registration using tissue volume preserving and vesselness constraints. *Medical Image Analysis*, 2022.

[29] Yibo Wang, Wen Qian, Mengqi Li, and Xuming Zhang. A transformer-based network for deformable medical image registration. In *Artificial Intelligence: Second CAAI International Conference, CICAI 2022, Beijing, China, Aug. 27-28, 2022, Revised Selected Papers, Part I*, pages 502-513. Springer, 2022.

[30] Marek Wodzinski, Artur Jurgas, Niccolo Marini, Manfredo Atzori, and Henning Muller. Unsupervised method for intra-patient registration of brain magnetic resonance images based on objective function weighting by inverse consistency: Contribution to the bratsreg challenge. *arXiv preprint arXiv:2211.07386*, 2022.

[31] Qingsong Yao, Li Xiao, Peihang Liu, and S Kevin Zhou. Label-free segmentation of covid-19 lesions in lung ct. *IEEE Transactions on Medical Imaging*, 40(10):2808-2819, 2021.

[32] Xiaoman Zhang, Weidi Xie, Chaoqin Huang, Ya Zhang, Xin Chen, Qi Tian, and Yanfeng Wang. Self-supervised tumor segmentation with sim2real adaptation. *IEEE Journal of Biomedical and Health Informatics*, 2023.

[33] Zijun Zhang. Improved adam optimizer for deep neural networks. In 2018 *IEEE/ACM 26th international symposium on quality of service (IWQoS)*, pages 1-2. IEEE, 2018.

[34] Bowen Zhao, G. Christensen, Joo Hyun Song, Yue Pan, Sarah E. Gerard, Joseph M. Reinhardt, Kaifang Du, Taylor J. Patton, John E. Bayouth, and Geoffrey D. Hugo. Tissue-volume preserving deformable image registration for 4dct pulmonary images. 2016 *IEEE Conference on Computer Vision and Pattern Recognition Workshops (CVPRW)*, pages 481-489, 2016.

[35] Shengyu Zhao, Yue Dong, Eric I Chang, Yan Xu, et al. Recursive cascaded networks for unsupervised medical image registration. In *Proceedings of the IEEE/CVF international conference on computer vision*, pages 10600-10610, 2019.

[36] Shengyu Zhao, Tingfung Lau, Ji Luo, I Eric, Chao Chang, and Yan Xu. Unsupervised 3d end-to-end medical image registration with volume tweening network. *IEEE Journal of Biomedical and Health Informatics*, 24(5):1394-1404, 2019.

What is claimed is:

1. A computer-implemented method for performing deformable registration of a moving image and a fixed image, the moving image being a medical image that images an organ having one or more tumor regions, each of the moving and fixed images being a three-dimensional (3D) image, the method comprising:
    performing a first computing process for generating a soft tumor mask (STM), the STM being a map of probability distribution for indicating a likelihood of an individual voxel of the organ in the moving image being located in the one or more tumor regions, wherein the first computing process comprises:
        using a first registration network to generate a first deformation field used for warping the moving image to align with the fixed image;
        estimating a change of volume at each voxel of the organ in warping the moving image according to the first deformation field to thereby generate a first map of volume-change distribution over the organ, wherein the first map of volume-change distribution over the organ is computed by $$D_{\theta 1}(x) = \max(D'_{\theta 1}(x), 1/D'_{\theta 1}(x)), x \in \Omega,$$

in which $$D'_{\theta 1}(x) = |J_{\theta 1(x)}|/\beta$$

where:
    $D_{\theta 1}(x)$ denotes a volume-change distance taken from the first map of volume-change distribution and computed for a voxel x of the organ in the moving image;
    $\Omega$ stands for a 3D space;
    $|J_{\theta 1(x)}|$ is a Jacobian determinant of the first deformation field, where the Jacobian determinant is computed for the voxel x; and
    $\beta$ is a predicted ratio of a first volume of the organ in the warped image to a second volume of the organ in the moving image; and
    mapping the first map of volume-change distribution to the map of probability distribution to thereby generate the STM; and
performing a second computing process for generating a warped image, the warped image being a 3D image obtained by warping the moving image to align with the fixed image, the second computing process being a machine-learning process trainable under an objective of minimizing a training loss computed as a weighted sum of a plurality of component losses, wherein the plurality of component losses includes:
    a volume-preserving loss for measuring a loss due to failure of keeping the one or more tumor regions unchanged in volume during warping the moving image, the volume-preserving loss being computed according to at least the STM; and
    a weighted similarity loss for measuring a loss of similarity over a non-tumor part of the organ between the warped image and the fixed image, the weighted similarity loss being computed according to at least the STM;
such that the one or more tumor regions are preserved in volume during generating the warped image from the moving image while promoting similarity in the non-tumor part between the moving image and the fixed image during aligning the moving image with the fixed image.

2. The method of claim 1, wherein:
    the first registration network is a similarity-based registration network that is modeled by a first plurality of parameters and that is trainable; and
    the first computing process further comprises training the first registration network to fix the first plurality of parameters before using the first registration network to generate the first deformation field.

3. The method of claim 1, wherein:
    in mapping the first map of volume-change distribution to the map of probability distribution, a transformation function is used to process the volume-change distance to yield a resultant probability value for the individual voxel in the map of probability distribution; and
    the transformation function is a sigmoid function.

4. The method of claim 1, wherein the second computing process comprises:
    using a second registration network to generate a second deformation field used for warping the moving image to align with the fixed image, wherein the second registration network is trainable and is modeled by a second plurality of parameters;
    spatially transforming the moving image according to the second deformation field to generate the warped image;
    training the second registration network by optimizing the second plurality of parameters in a sense of minimizing the training loss;
    estimating a change of volume at each voxel of the organ in warping the moving image according to the second deformation field to thereby generate a second map of volume-change distribution over the organ;
    in computing the training loss, computing the volume-preserving loss according to the second map of volume-change distribution and the STM; and
    in computing the training loss, computing the weighted similarity loss according to the warped image, the fixed image and the STM.

5. The method of claim 4, wherein:
the plurality of component losses further includes a regularization loss for measuring a loss due to overfitting; and
the second computing process further comprises:
in computing the training loss, computing the regularization loss according to the second deformation field.

6. The method of claim 4, wherein the second map of volume-change distribution over the organ is computed by $$D_{\theta 2}(x) = \max(D'_{\theta 2}(x), 1/D'_{\theta 2}(x)), x \in \Omega,$$

in which $$D'_{\theta 2}(x) = |J_{\theta 2(x)}|/\beta$$

where:
- $D_{\theta 2}(x)$ denotes a volume-change distance taken from the second map of volume-change distribution and computed for a voxel x of the organ in the moving image;
- $\Omega$ stands for a 3D space;
- $|J_{\theta 2}(x)|$ is a Jacobian determinant of the second deformation field, where the Jacobian determinant is computed for the voxel x; and
- $\beta$ is a predicted ratio of a first volume of the organ in the warped image to a second volume of the organ in the moving image.

7. The method of claim 6, wherein the volume-preserving loss, $L_{VP}$, is computed by $$L_{VP} = \frac{1}{|I_m|} \sum_{x \in \Omega} D_{\theta 2}(x) \cdot STM(x)$$

where:
- STM(x) is a value of the STM for the voxel x; and
- $|I_m|$ is a volume of the moving image.

8. The method of claim 6, wherein the weighted similarity loss, $L_{w\_sim}$, is computed by $$L_{w\_sim} = \frac{\text{Cov}'[I_w, I_f]}{\sqrt{\text{Cov}[I_w, I_w] \cdot \text{Cov}[I_f, I_f]}}$$

in which $$\text{Cov}'[I_w, I_f] = \frac{\sum_{x \in \Omega} (I_w(x) - \overline{I_w})(I_f(x) - \overline{I_f})(1 - STM(x))}{\sum_{x \in \Omega} (1 - STM(x))}$$

where:
- $\Omega$ stands for a 3D space;
- STM(x) is a value of the STM for a voxel x of the organ in the moving image;
- $I_w$ stands for the warped image, $\overline{I_w}$ is a mean of $I_w$, and $I_w(x)$ is a value of $I_w$ at the voxel x;
- $I_f$ stands for the fixed image, $\overline{I_f}$ is a mean of $I_f$ and $I_f(x)$ is a value of $I_f$ at the voxel x;
- $\text{Cov}'[I_w, I_f]$ is a weighted covariance of $I_w$ and $I_f$ with the STM as a weight;
- $\text{Cov}[I_w, I_w]$ is a covariance of $I_w$; and
- $\text{Cov}[I_f, I_f]$ is a covariance of $I_f$.

9. The method of claim 1, wherein the second computing process comprises:
using a second registration network to generate a second deformation field used for warping the moving image to align with the fixed image, wherein the second registration network is trainable and is modeled by a second plurality of parameters;
spatially transforming the moving image according to the second deformation field to generate the warped image;
training the second registration network by optimizing the second plurality of parameters in a sense of minimizing the training loss;
estimating a change of volume at each voxel of the organ in warping the moving image according to the second deformation field to thereby generate a second map of volume-change distribution over the organ;
in computing the training loss, computing the volume-preserving loss according to the second map of volume-change distribution and the STM; and
in computing the training loss, computing the weighted similarity loss according to the warped image, the fixed image and the STM.

10. The method of claim 9 further comprising:
performing a preregistration step before performing the first computing process, wherein the preregistration step comprises:
filtering the moving image with a bilateral filter to yield a filtered moving image, wherein the bilateral filter is configured to preserve edges of the moving image and to smooth interior regions thereof;
using the first registration network to register the filtered moving image and the fixed image to thereby yield a third deformation field; and
spatially transforming the moving image according to the third deformation field to generate an unfiltered warped image for enabling edges of the unfiltered warped image to align with the fixed image without introducing volume changes to said edges;
wherein in the first computing process, the first deformation field is generated by using the first registration network to register the unfiltered warped image and the fixed image.

11. A computer-implemented method for performing deformable registration of a moving image and a fixed image, the moving image being a medical image that images an organ having one or more tumor regions, each of the moving and fixed images being a three-dimensional (3D) image, the method comprising:
performing a first computing process for generating a soft tumor mask (STM), the STM being a map of probability distribution for indicating a likelihood of an individual voxel of the organ in the moving image being located in the one or more tumor regions; and
performing a second computing process for generating a warped image, the warped image being a 3D image obtained by warping the moving image to align with the fixed image, the second computing process being a machine-learning process trainable under an objective of minimizing a training loss computed as a weighted sum of a plurality of component losses, wherein the plurality of component losses includes:
a volume-preserving loss for measuring a loss due to failure of keeping the one or more tumor regions unchanged in volume during warping the moving image, the volume-preserving loss being computed according to at least the STM; and
a weighted similarity loss for measuring a loss of similarity over a non-tumor part of the organ between the warped image and the fixed image, the weighted similarity loss being computed according to at least the STM;

and wherein the second computing process comprises:
using a second registration network to generate a second deformation field used for warping the moving image to align with the fixed image, wherein the second registration network is trainable and is modeled by a second plurality of parameters;
spatially transforming the moving image according to the second deformation field to generate the warped image;
training the second registration network by optimizing the second plurality of parameters in a sense of minimizing the training loss;
estimating a change of volume at each voxel of the organ in warping the moving image according to the second deformation field to thereby generate a second map of volume-change distribution over the organ, wherein the second map of volume-change distribution over the organ is computed by $$D_{\theta_2}(x) = \max(D'_{\theta 2}(x), 1/D'_{\theta 2}(x)), x \in \Omega,$$

in which $$D'_{\theta 2}(x) = |J_{\theta 2(x)}|/\beta$$

where:
$D_{\theta 2}(x)$ denotes a volume-change distance taken from the second map of volume-change distribution and computed for a voxel x of the organ in the moving image;
$\Omega$ stands for a 3D space;
$|J_{\theta 2(x)}|$ is a Jacobian determinant of the second deformation field, where the Jacobian determinant is computed for the voxel x; and
$\beta$ is a predicted ratio of a first volume of the organ in the warped image to a second volume of the organ in the moving image;
in computing the training loss, computing the volume-preserving loss according to the second map of volume-change distribution and the STM; and
in computing the training loss, computing the weighted similarity loss according to the warped image, the fixed image and the STM;
such that the one or more tumor regions are preserved in volume during generating the warped image from the moving image while promoting similarity in the non-tumor part between the moving image and the fixed image during aligning the moving image with the fixed image.

12. The method of claim 11, wherein the volume-preserving loss, $L_{VP}$, is computed by $$L_{VP} = \frac{1}{|I_m|} \sum_{x \in \Omega} D_{\theta 2}(x) \cdot STM(x)$$

where:
STM (x) is a value of the STM for the voxel x; and
$|I_m|$ is a volume of the moving image.

13. A computer-implemented method for performing deformable registration of a moving image and a fixed image, the moving image being a medical image that images an organ having one or more tumor regions, each of the moving and fixed images being a three-dimensional (3D) image, the method comprising:
performing a first computing process for generating a soft tumor mask (STM), the STM being a map of probability distribution for indicating a likelihood of an individual voxel of the organ in the moving image being located in the one or more tumor regions; and
performing a second computing process for generating a warped image, the warped image being a 3D image obtained by warping the moving image to align with the fixed image, the second computing process being a machine-learning process trainable under an objective of minimizing a training loss computed as a weighted sum of a plurality of component losses, wherein the plurality of component losses includes:
a volume-preserving loss for measuring a loss due to failure of keeping the one or more tumor regions unchanged in volume during warping the moving image, the volume-preserving loss being computed according to at least the STM; and
a weighted similarity loss for measuring a loss of similarity over a non-tumor part of the organ between the warped image and the fixed image, the weighted similarity loss being computed according to at least the STM, wherein the weighted similarity loss, $L_{w\_sim}$, is computed by $$L_{w\_sim} = \frac{Cov'[I_w, I_f]}{\sqrt{Cov[I_w, I_w] \cdot Cov[I_f, I_f]}}$$

in which $$Cov'[I_w, I_f] = \frac{\sum_{x \in \Omega}(I_w(x) - \overline{I_w})(I_f(x) - \overline{I_f})(1 - STM(x))}{\sum_{x \in \Omega}(1 - STM(x))}$$

where:
$\Omega$ stands for a 3D space;
STM(x) is a value of the STM for a voxel x of the organ in the moving image;
$I_w$ stands for the warped image, $\overline{I_w}$ is a mean of $I_w$, and $I_w(x)$ is a value of $I_w$ at the voxel x;
$I_f$ stands for the fixed image, $\overline{I_f}$ is a mean of $I_f$, and $I_f(x)$ is a value of $I_f$ at the voxel x;
$Cov'[I_w, I_f]$ is a weighted covariance of $I_w$ and $I_f$ with the STM as a weight;
$Cov[I_w, I_w]$ is a covariance of $I_w$; and
$Cov[I_f, I_f]$ is a covariance of $I_f$;
and wherein the second computing process comprises:
using a second registration network to generate a second deformation field used for warping the moving image to align with the fixed image, wherein the second registration network is trainable and is modeled by a second plurality of parameters;
spatially transforming the moving image according to the second deformation field to generate the warped image;
training the second registration network by optimizing the second plurality of parameters in a sense of minimizing the training loss;
estimating a change of volume at each voxel of the organ in warping the moving image according to the second deformation field to thereby generate a second map of volume-change distribution over the organ;

in computing the training loss, computing the volume-preserving loss according to the second map of volume-change distribution and the STM; and in computing the training loss, computing the weighted similarity loss according to the warped image, the fixed image and the STM;

such that the one or more tumor regions are preserved in volume during generating the warped image from the moving image while promoting similarity in the non-tumor part between the moving image and the fixed image during aligning the moving image with the fixed image.

* * * * *